United States Patent [19]
Kurihara

[11] Patent Number: 5,285,471
[45] Date of Patent: Feb. 8, 1994

[54] SPREAD SPECTRUM RECEIVING DEVICE

[75] Inventor: Takao Kurihara, Tokyo, Japan

[73] Assignee: Clarion Co., Ltd., Tokyo, Japan

[21] Appl. No.: 993,378

[22] Filed: Dec. 18, 1992

[30] Foreign Application Priority Data

Dec. 20, 1991 [JP] Japan .................. 3-355212
Feb. 21, 1992 [JP] Japan .................. 4-072315

[51] Int. Cl.$^5$ .................. H04L 27/30; H04L 27/06; H03D 3/18
[52] U.S. Cl. .......................... 375/1; 375/82; 375/95
[58] Field of Search .................. 375/1, 82, 95, 96

[56] References Cited

U.S. PATENT DOCUMENTS

| | | | |
|---|---|---|---|
| 4,616,364 | 10/1986 | Lee | 375/1 |
| 5,181,226 | 1/1993 | Cantwell | 375/1 |
| 5,208,829 | 5/1993 | Soleimani et al. | 375/1 |
| 5,208,830 | 5/1993 | Cornec et al. | 375/1 |

Primary Examiner—Gilberto Barron, Jr.
Attorney, Agent, or Firm—Flynn, Thiel, Boutell & Tanis

[57] ABSTRACT

A spread spectrum receiving device is disclosed, in which data demodulation is effected in such a way that a received signal is divided into two parts, from which a COS PN code chip signal and a SIN PN code chip signal are obtained; that these chip signals are A/D-converted by means of A/D converters and then given to digital correlators; and that correlation outputs thus obtained are combined to synthesize a final correlation output. Further there are disposed a plurality of steering gates on the input side of the A/D converters. The a/D conversion can be effected in the neighborhood of a point, where the level of PN code chip waveforms is stable, owing to the fact that the steering gates are controlled by control signals obtained by processing the correlation outputs or output of the A/D conversion. In this way it is made unnecessary to raise the sampling frequency for the A/D conversion and to increase the number of stages of shift registers in the digital correlators.

11 Claims, 20 Drawing Sheets

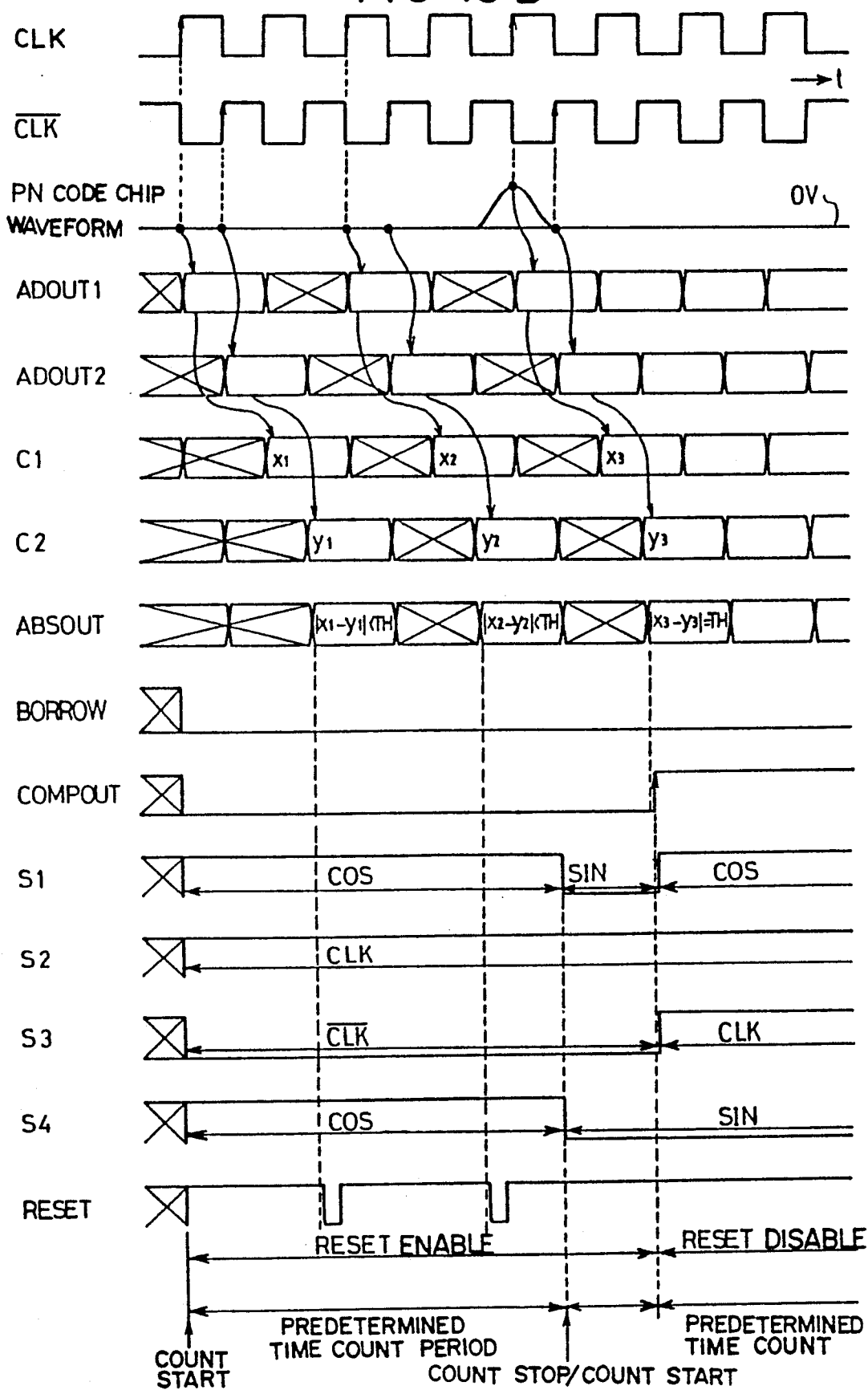

SPREAD SPECTRUM RECEIVING DEVICE

FIELD OF THE INVENTION

The present invention relates to an improvement for a spread spectrum communication (hereinbelow abbreviated to SSC) device using digital correlation devices.

BACKGROUND OF THE INVENTION

In an SSC, as indicated by (A) in FIG. 9, a pseudo noise code (hereinbelow abbreviated to PN code) is modulated by data and a carrier signal is modulated by the modulated PN code to be transmitted.

In (A) in FIG. 9, reference numeral 1 represents the data; 2 is a modulator; 3 is a PN code generator; 4 is a carrier signal generator; 5 is a modulator; and 6 is an antenna.

On the receiver side, as indicated by (B) in FIG. 9, the signal is received and correlated with a PN code serving as a reference by a correlator. A self-correlation spike waveform having a relatively great amplitude appearing when the signal described previously and the code are in accordance with each other and when they are close to each other is processed for reproducing data.

In (B) in FIG. 9, reference numeral 7 is an antenna; 8 is a correlator; 9 is a reference PN code generator; 10 is a data demodulator; and 11 represents the data.

As an example of the correlator described above there is known a digital correlator. FIG. 10 shows a basic circuit construction of the digital correlator. In the figure, S and R are shift registers; Ex-NOR$_1$ to Ex-NOR$_1$ are NOR gates; and ADD is an adder. Reference data REF of N bits are inputted serially to the shift register R of N bits in synchronism with a clock RCLK. On the other hand, information data DATA are inputted serially to the register S of N bits in synchronism with a clock SCLK. Accordance and disaccordance of the contents of the registers are detected by the NOR gates for every bit and the total number of bits, which are in accordance with each other, is obtained by the adder ADD.

FIG. 11 shows one of constructions, in the case where the digital correlator as indicated in FIG. 10 is applied to the SSC. In the FIG. 1 and 2 are multipliers; 3 and 4 are low pass filters (LPF); 5 and 6 are A/D converters; 7 and 8 are digital correlators; and 9 is an adder. FIG. 12 is a diagram for explaining the data demodulation at receiving an SS signal (hereinbelow abbreviated to SS-BPSK) modulated by the bi-phase shift keying (hereinbelow abbreviated to BPSK).

Now asynchronous demodulation operation for the SS-BPSK signal according to FIG. 11 will be explained. The SS-BPSK signal can be expressed by Equation (1);

$$r(t) = \{f(t) \oplus PN(t)\} \cdot COS\omega_0 t \quad (1)$$

f(t): digital data corresponding to "1" or "0"
PN(t): PN code (Pseudo Noise Code)
$\oplus$: exclusive or
COS$\omega$ot modulation carrier signal In FIG. 11, as indicated in FIG. 12, a COS component and a SIN component are obtained by multiplying the SS-BPSK signal by COS$\omega$t and SIN$\omega$t having a same frequency as a modulation carrier frequency for the SS-BPSK signal by means of the multiplier 1 and 2, respectively. PN code chips are extracted from the components by the low pass filters LPF 3 and 4 having a cut-off frequency, which is equal to the PN code clock frequency. The data modulation is effected by effecting the base band processing by means of the digital correlators 7 and 8, after they have been A/D-converted by means of the A/D converters 5 and 6, respectively.

That is, correlation values of the digital data of the COS component and the SIN component are obtained by means of the digital correlators 7 and 8, for which reference data, which are equal to a result of the exclusive logic sum of e.g. data "1" at the transmission and the PN code, are set. Then the data demodulation is effected on the basis of the value obtained by adding the different correlation values by means of the adder 9.

However the prior art digital correlating device described above has a problem as follows.

That is, when PN code chip waveforms obtained by the low pass filters LPF 5 and 6 indicated in FIG. 11 are A/D-converted, it is desirable to sample ideally a point P, at which the level of the PN code chip waveforms is most stable, with an interval, which is equal to the PN code clock period, as indicated in FIG. 13. However, it is difficult to sample the point P in FIG. 13 by the asynchronous SS-BPSK demodulating method as indicated in FIG. 11. As a measure taking the place thereof, there is known usually a method, by which the sampling frequency is raised. However, by this method, since the amount of information corresponding to one PN code chip increases with increasing sampling frequency, it is necessary to increase the number of stages of the shift registers in the digital correlators.

For example, in the case indicated by (B) in FIG. 13, the sampling period T is reduced to ¼ of that indicated by (A) in FIG. 13. Therefore the number of stages of the shift registers in the digital correlators should be increased by a factor of 4.

OBJECT OF THE INVENTION

The object of the present invention is to provide a system, by which the sampling frequency is increased by making it possible to effect the A/D conversion at the neighborhood of the point, where the level of the PN code chip waveforms is stable, so that it is not necessary to increase the number of stages of the shift registers in the digital correlators.

SUMMARY OF THE INVENTION

In order to achieve the above object, a spread spectrum receiving device according to the present invention is characterized in that it comprises dividing and converting means, which divides a received signal into two parts, which are converted into a COS component signal and a SIN component signal by using a first carrier signal having a same frequency as a modulation frequency for the received signal and a second carrier signal having the same frequency and a phase different by $\pi/2$ from that of the first carrier signal, respectively; a first and a second filter for extracting a COS PN code chip signal and a SIN PN code chip signal from the COS component signal and the SIN component signal, respectively; first and second A/D converting means for outputting A/D-converted signals corresponding to the COS PN code chip signal and the SIN PN code chip signal, respectively; a first digital correlator for correlating an output of the first A/D-converting means with a first reference signal; a second digital correlator for correlating an output of the second A/D-converting means with a second reference signal; steering gate means disposed between the first and the second filter on one side and the first and the second A/D-converting means on the other side, the steering gate means giving the first and the second A/D-converting means the COS PN code chip signal and the SIN PN code chip signal, respectively, with a predetermined timing according to a control signal; subtracting means for effecting a subtraction between outputs of the first and the second digital correlator to output a signal corresponding to a result of the subtraction; comparing means for judging whether the signal corresponding to the result of the subtraction is within a predetermined region or not to output a judgment signal; and control means for controlling the steering gate means by controlling the control signal, based on a state of an output of the comparing means and the signal corresponding to the result of the subtraction.

In the device according to the present invention a PN code chip waveform of either one of the COS component and the SIN component is sampled and A/D-converted by using sampling clocks of positive and reserve phases. Values obtained by the A/D conversion are correlated with predetermined reference values. When the difference between correlation values obtained by using the positive phase clock and the reverse phase clock doesn't reach a predetermined value, the sampling clocks of positive and reverse phases are switched over to other sampling clocks having positive and reverse phases different therefrom to sample the PN code chip waveforms.

DETAILED DESCRIPTION

Figure 1:
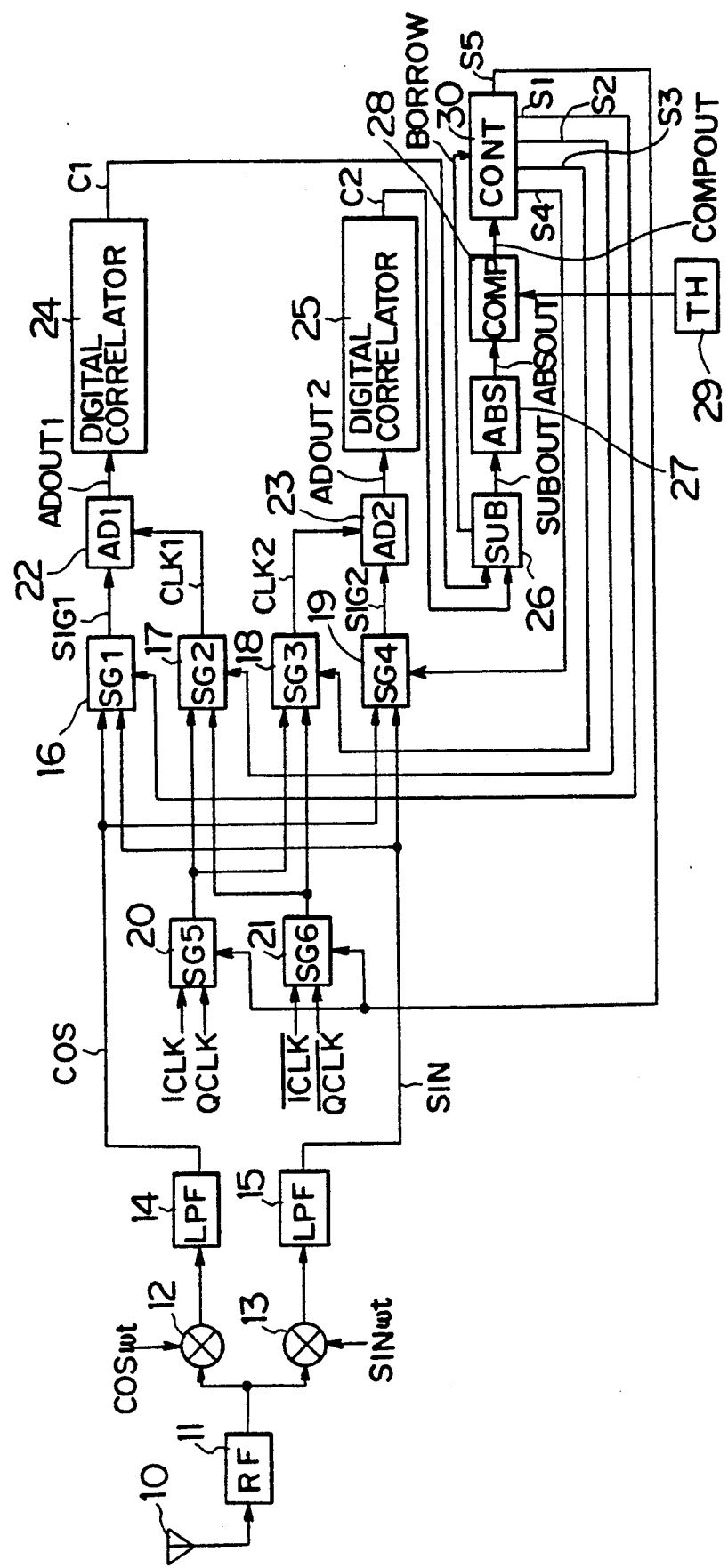
FIG. 1 is a block diagram showing the construction of a spread spectrum receiving device, which is an embodiment of the present invention.

Hereinbelow some embodiment of the present invention indicated in the drawings will be explained.

FIG. 1 shows an embodiment of the spread spectrum receiving device according to the present invention, in which reference numeral 10 is an antenna; 11 is an RF amplifier; 12 and 13 are multipliers; 14 and 15 are LPFs; 16 to 21 are steering gates (SG1 to SG6); 22 and 23 are A/D converters (AD1, AD2); 24 and 25 are digital correlators; 26 is a subtracter (SUB); 27 is an absolute value forming device (ABS); 28 is a comparator (COMP); 29 is a threshold value generator (TH); and 30 is a control circuit (CONT).

Figure 2A:
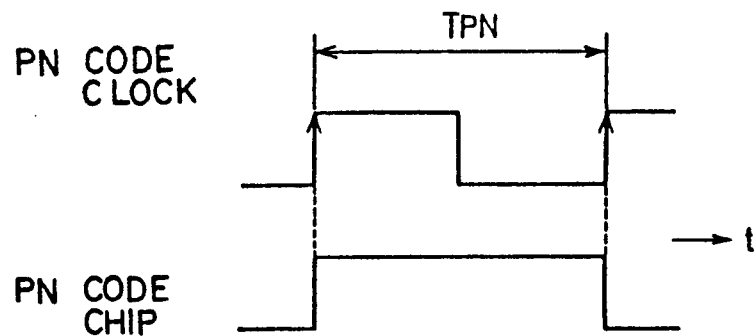
FIGS. 2A and 2B show waveforms for explaining the operation of the embodiment indicated in FIG. 1.
Figure 2B:
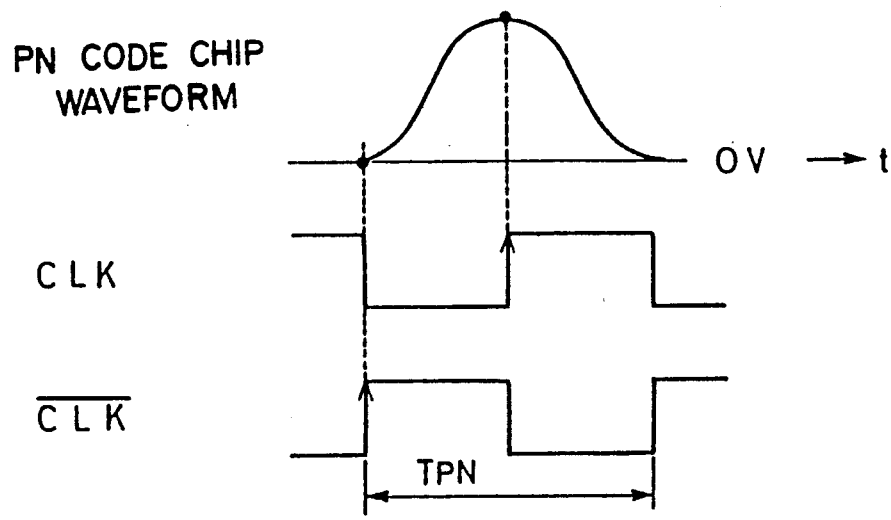

In FIG. 1, PN code chip waveforms of the COS component and the SIN component are inputted to the steering gates 16 (SG1) and 19(SG4), as described previously. A positive phase clock ICLK and a $\pi/4$ shift positive phase clock QCLK as well as a reverse phase clock $\overline{ICLK}$ and a $\pi/4$ shift reverse phase clock $\overline{QCLK}$ having a period, which is equal to a PN code chip width, are inputted to the steering gates 20 (SG5) and 21 (SG6) as sampling clocks used for the A/D conversion, as indicated by (A) and (B) in FIG. 2, respectively. The positive phase clock ICLK or QCLK and the reverse phase clock $\overline{ICLK}$ or $\overline{QCLK}$, which are outputs of the steering gates 20 and 21, are inputted to the steering gates 17 (SG2) and 18 (SG3), respectively. The outputs SIG1 and CLK1 of the steering gates 16 and 17 are inputted to the A/D converter 22 (AD1), which A/D-converts the PN code chip waveform of the COS component. On the other hand, the outputs SIG2 and CLK2 of the steering gates 18 and 19 are inputted to the A/D converter 23 (AD1), which A/D-converts the PN code chip waveform of the SIN component.

Figure 5:
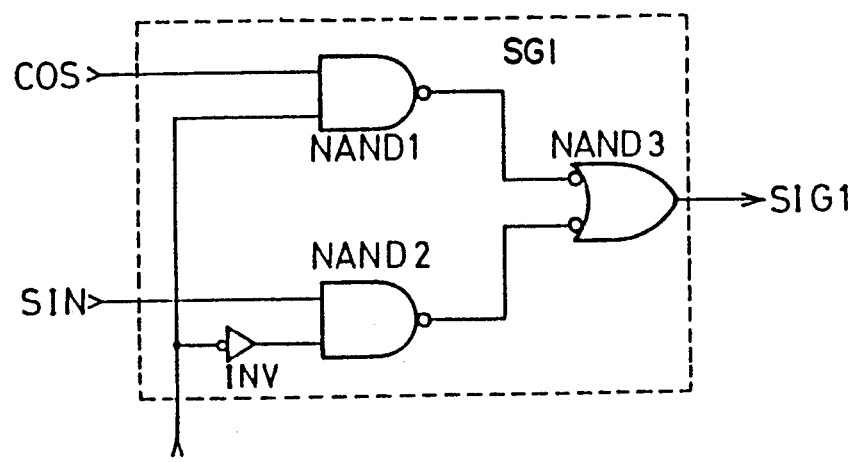
FIG. 5 is a block diagram showing an example of the construction of a steering gate.

Each, of the steering gates described above can be realized e.g. by a construction using three NAND gates NAND1, NAND2 and NAND3 and an inverter INV indicated in FIG. 5. In FIG. 5, when the select signal S1 is "1", the PN code chip waveform COS of the COS component is selected to be outputted as SIG1. On the other hand, when the select signal S1 is "0", the PN code chip waveform SIN of the SIN component is selected to be outputted as SIG1.

Select signals S1 and S4 are inputted from the control circuit 30 to the steering gates 16 and 19, respectively. In the initial state, it is supposed that the select signals S1 and S4 are "1" so that the PN code chip waveform of the COS component is selected. Further it is supposed that the select signal S5 is "1" so that the positive phase clock ICLK and the reverse clock $\overline{ICLK}$ are selected. In addition, it is presumed that select signals S2 and S3 are inputted from the control circuit 30 to the steering gates 17 and 18, respectively, and that in the initial state the select signal S2 is "1" so that the positive phase clock ICLK is selected, while the select signal S3 is "0" so that the reverse phase clock $\overline{ICLK}$ is selected.

Figure 3:
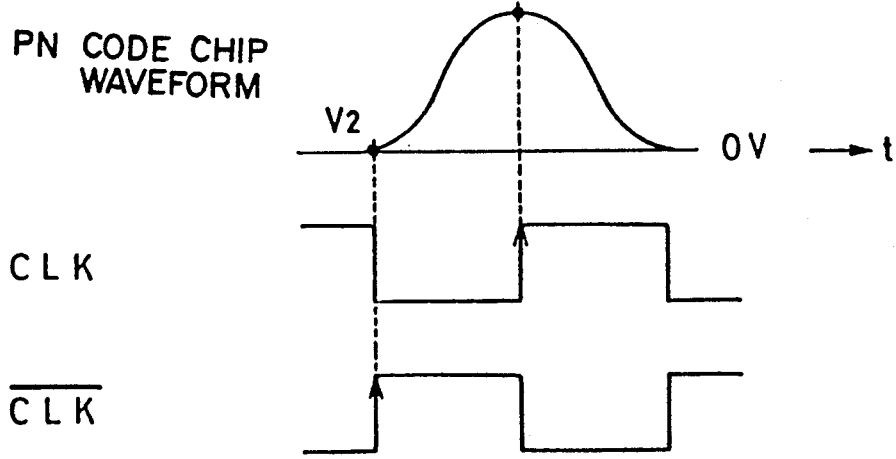
FIG. 3 shows waveforms for explaining the operation of the embodiment indicated in FIG. 1.

Consequently, the A/D converter 22 samples the PN code chip waveform SIG1 of the COS component with the positive phase clock CLK1, i.e. positive phase clock ICLK, to A/D-convert it. Similarly the A/D converter 23 samples the PN codechip waveform SIG2 of the COS component (SIG1=SIG2 at this point of time) with the reverse phase clock CLK2, i.e. reverse phase clock $\overline{ICLK}$, to A/D-convert it. The sampling is effected in such a way that, supposing e.g. that it is effected by the rising edge of the positive phase edge ICLK and the reverse phase clock $\overline{ICLK}$, in the case where the rising edge of either one of them samples a stabilization point $V_2$, the rising edge of the other samples O point $V_1$, as indicated in FIG. 3.

Outputs ADOUT1 and ADOUT2 of the A/D converters 22 and 23 are inputted to the corresponding digital correlators 24 and 25, respectively, and correlation values thereof with reference data previously set for the respective digital correlators are obtained. Then the correlation outputs C1 and C2 of the digital correlators 24 and 25 are inputted to the substracter 26 and a subtraction $$C1-C2 \qquad (2)$$

is carried out by the subtractor 26. An output SUBOUT of the subtracter 28 obtained as the result is inputted to the absolute value forming device 27.

Further, when the result of calculation of Equation (2) becomes negative and borrow is produced, a borrow signal BORROW is inputted to the control circuit 30.

The output SUBIYT of the subtracter 26 is transformed into an absolute value output ABSOUT by the absolute value forming device 27, which is compared with a threshold value TH.

Figure 4:
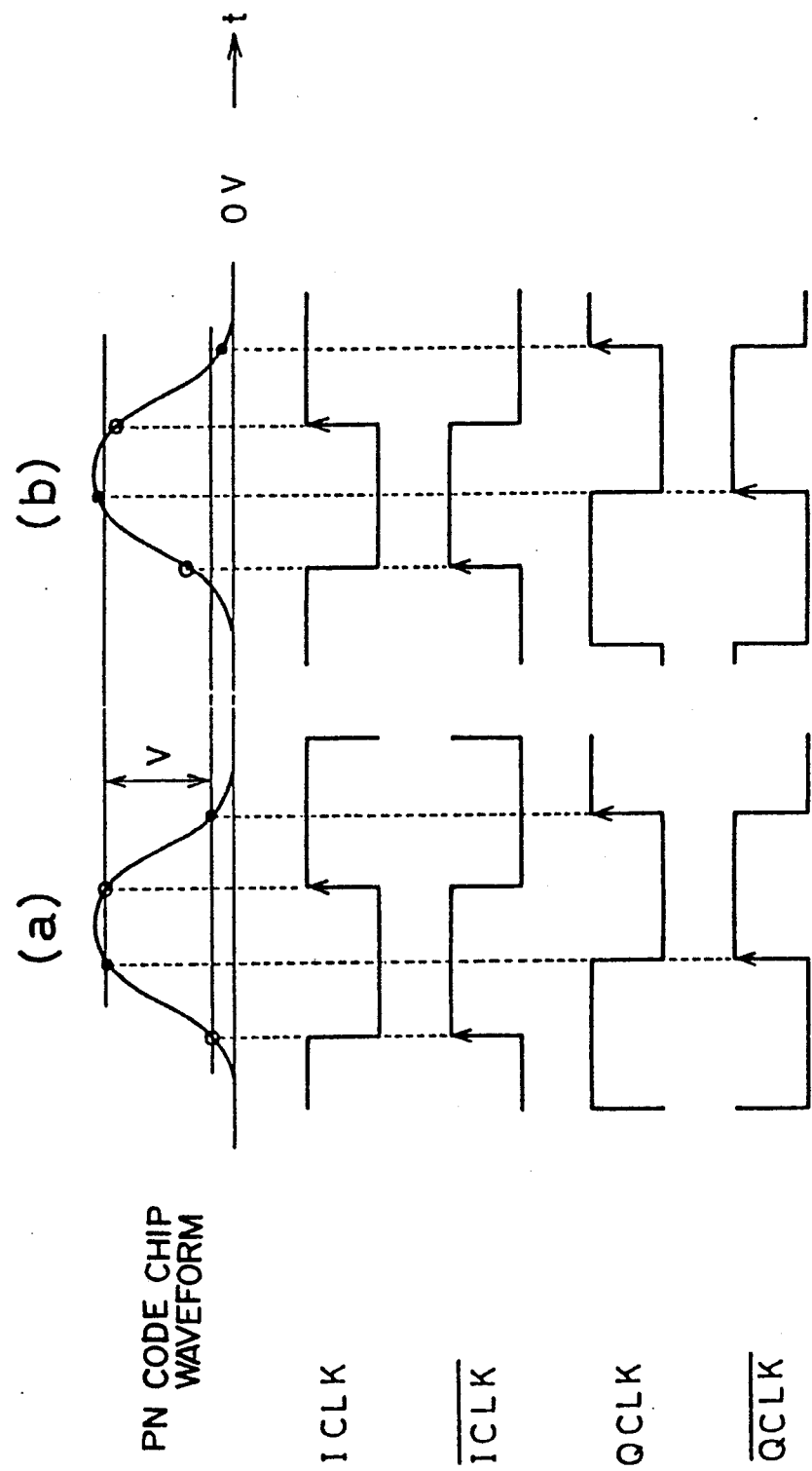
FIG. 4 shows waveforms for explaining the operation of the embodiment indicated in FIG. 1.
Figure 11:
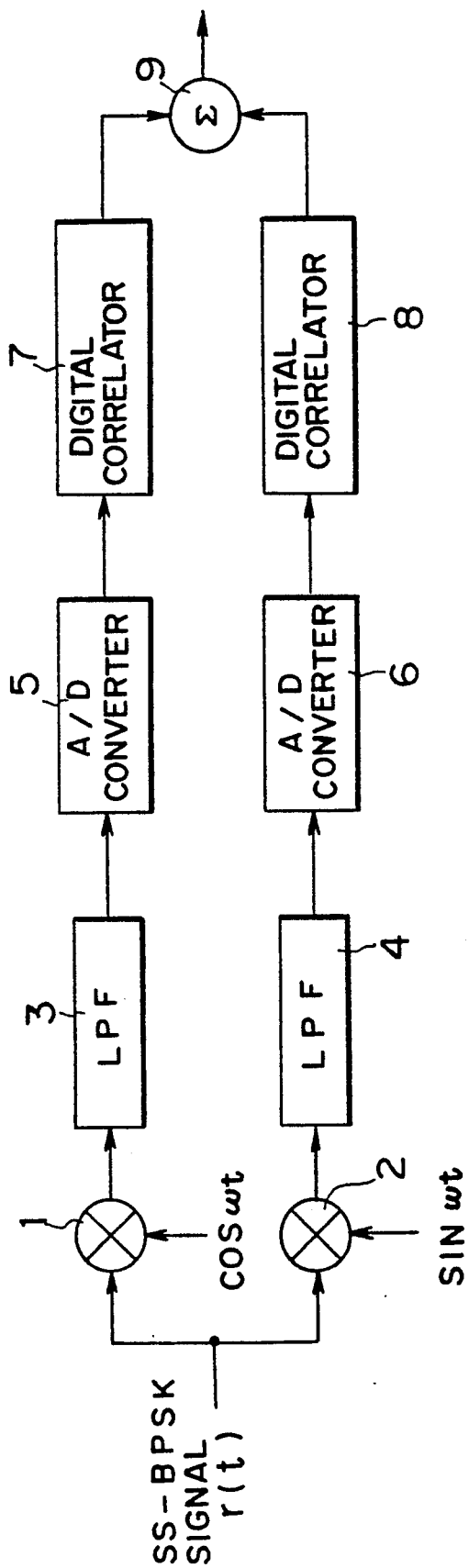
FIG. 11 is a block diagram showing the construction of a prior art spread spectrum receiving device using the digital correlator.

Now the threshold value TH is set at a value equal to a difference of the correlation value corresponding to a difference V between the sampling values with the positive phase clock and the reverse phase clock, obtained when the difference between the sampling values of the PN code chip waveform with the positive phase clock ICLK and the reverse phase clock $\overline{ICLK}$ and the difference between the sampling values thereof with the $\pi/4$ shift positive phase clock QCLK and the $\pi/4$ shift reverse phase clock $\overline{QCLK}$ are in a same time positional relationship, as indicated by (a) in FIG. 4. When the result of calculation of Equation (2) arrives at the threshold value, the comparator 28 outputs a trigger signal COMPOUT to the control circuit 30. When there is no input of the borrow signal BORROW from the subtracter 26, using the trigger signal COMPOUT, the control circuit 30 changes the state of the select signal S4 from "1" to "0" without changing the state of the select signal S5 so as to select the PN code chip waveform of the SIN component ad the state of the select signal S3 from "0" to "1" so as to select the positive phase clock ICLK. As the result, this construction is equivalent to that indicated in FIG. 11. This means that when the trigger signal COMPOUT is outputted from the comparator 28, the neighborhood of the stabilization point of the PN code chip waveform is caught.

Figure 6:
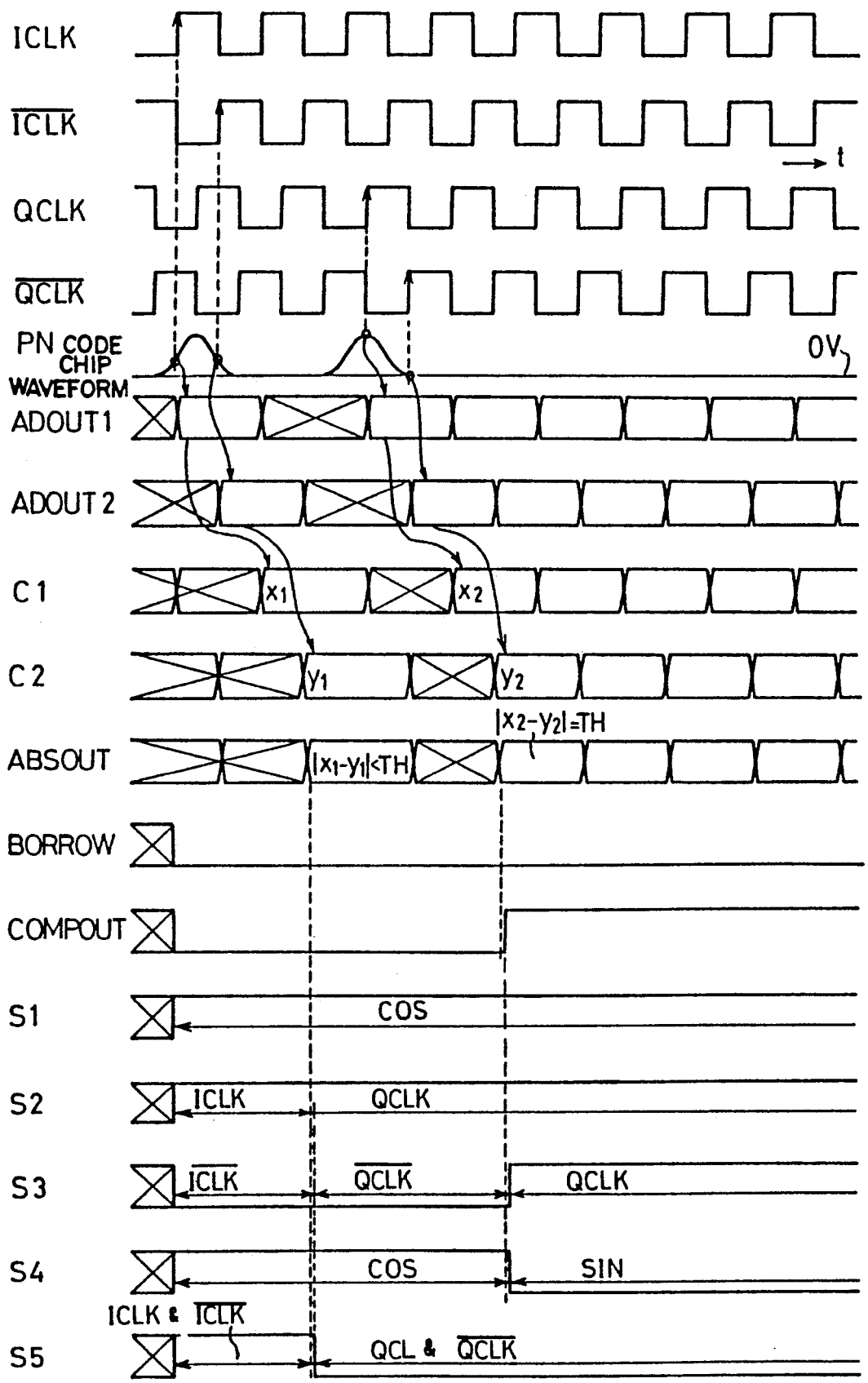
FIG. 6 is a timing chart for explaining the operation of the embodiment described above.

ON the contrary, when no trigger signal COMPOUT is outputted, the control circuit CONT judges that either one of the $\pi/4$ shift positive phase clock QCLK and the $\pi/4$ reverse phase clock $\overline{QCLK}$ samples the neighborhood of the stabilization point of the Pn code chip waveform and changes the state of the select signal from "1" to "0" to switch over the control signal so as to select the $\pi/4$ shift positive phase clock QCLK and the $\pi/4$ shift reverse phase clock $\overline{QCLK}$, as indicated by (b) in FIG. 4. Then the device performs an operation similar to that described previously for the case where the positive phase clock ICLK and the reverse phase clock $\overline{ICLK}$ are used. FIG. 6 shows a timing chart of the operation described above.

Figure 7:
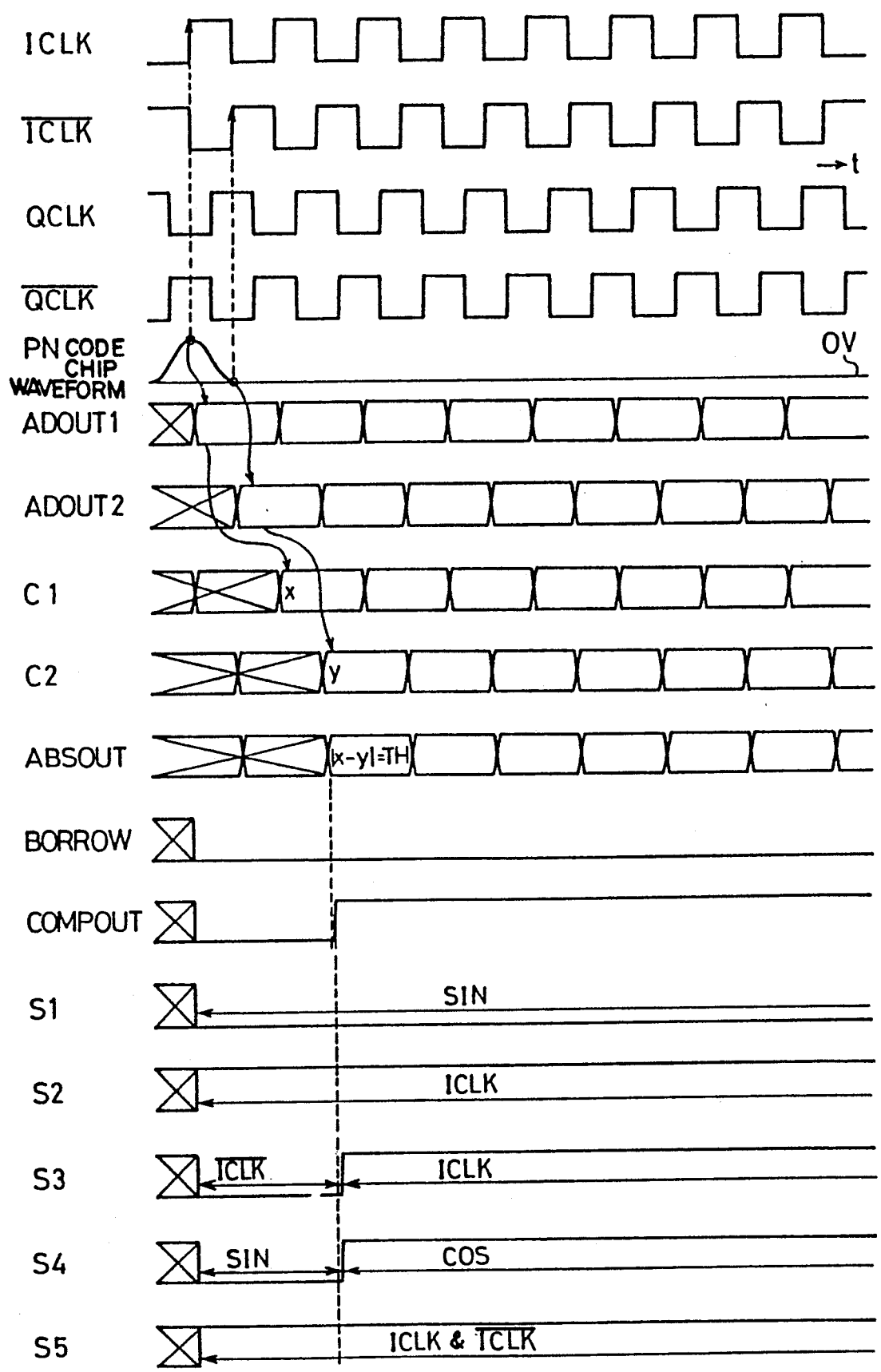
FIG. 7 is a timing chart for explaining the operation of the embodiment described above.
Figure 12:
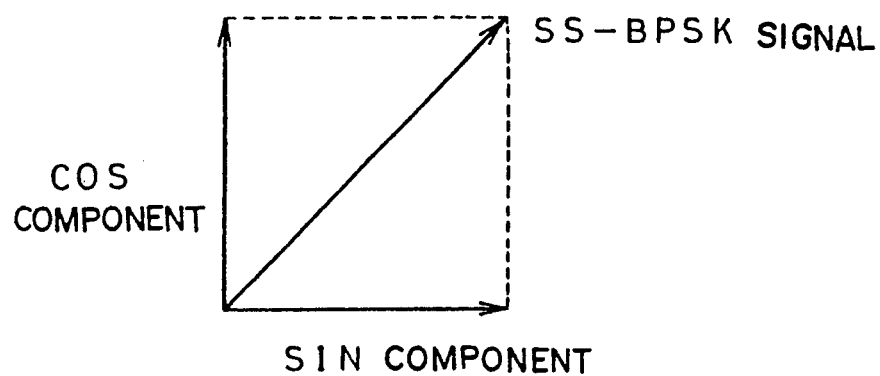
FIG. 12 is a vector diagram for explaining the operation of the prior art device described above.
Figure 13A:
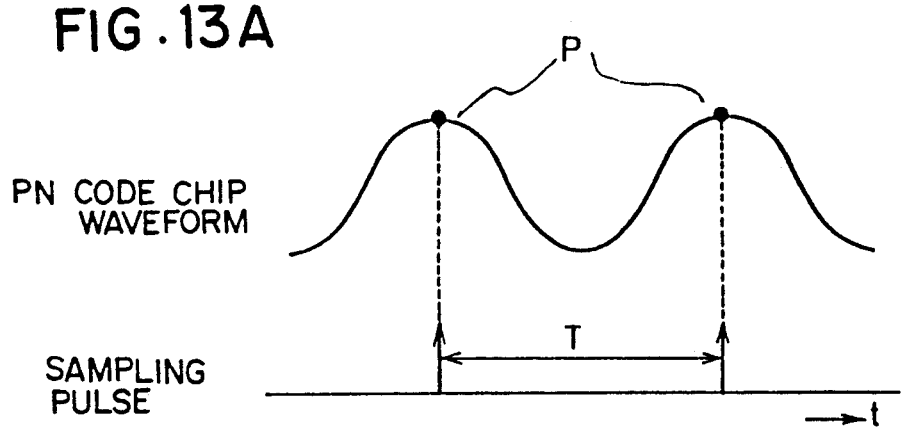
FIGS. 13A and 13B shows waveforms for explaining the operation of the prior art device described above.
Figure 13B:
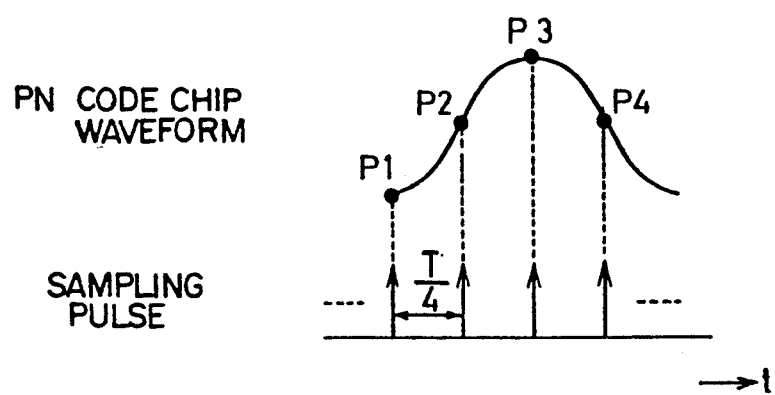

Further, when no trigger signal COMPOUT is outputted from the comparator 28, whichever clock, I or Q, is used, since there is a possibility that the state is continued, in which the modulation carrier phase of the received SS-BPSK signal and the phase of COSωt and SINωt having a frequency equal to the modulation carrier frequency of the SS-BPSK signal on the receiver side are in accordance with each other for SINωt, in order to perform the operation described above for the PN code chip waveform of the SIN component indicated in FIG. 12, the control circuit CONT changes the state of the select signals S1 and S4 from "1" into "0" and sets the control signal so as to select the PN code chip waveform of the SIN component. FIG. 7 shows a timing chart of the operation described above.

Figure 8:
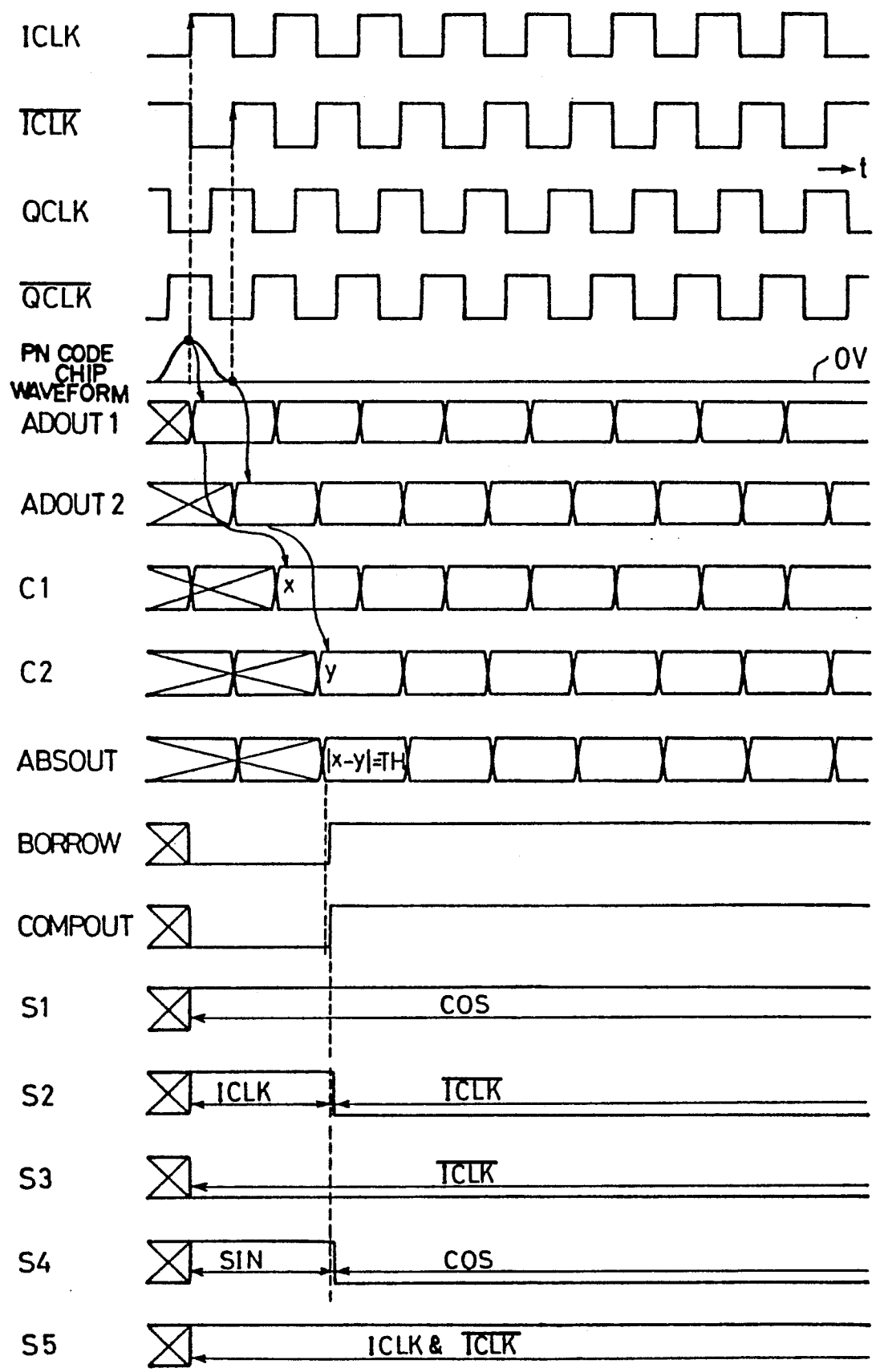
FIG. 8 is a timing chart for explaining the operation of the embodiment described above.
Figure 9A:
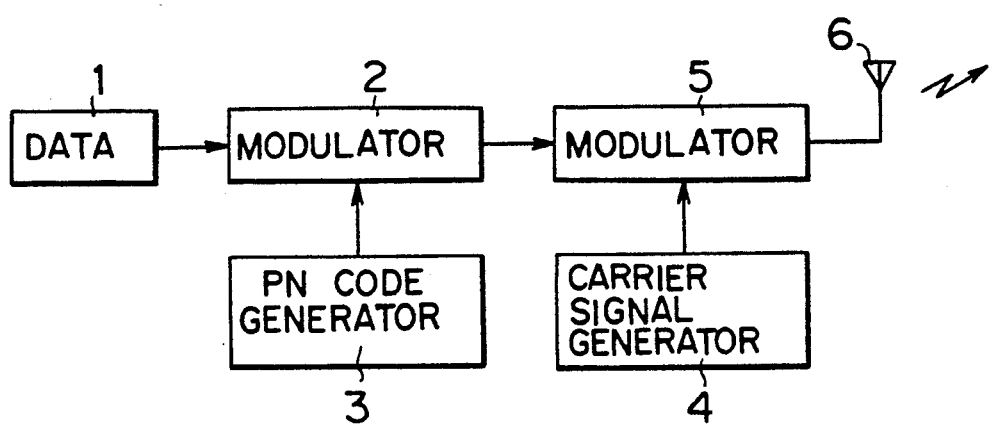
FIGS. 9A and 9B are block diagrams showing a prior art SSC system.
Figure 9B:
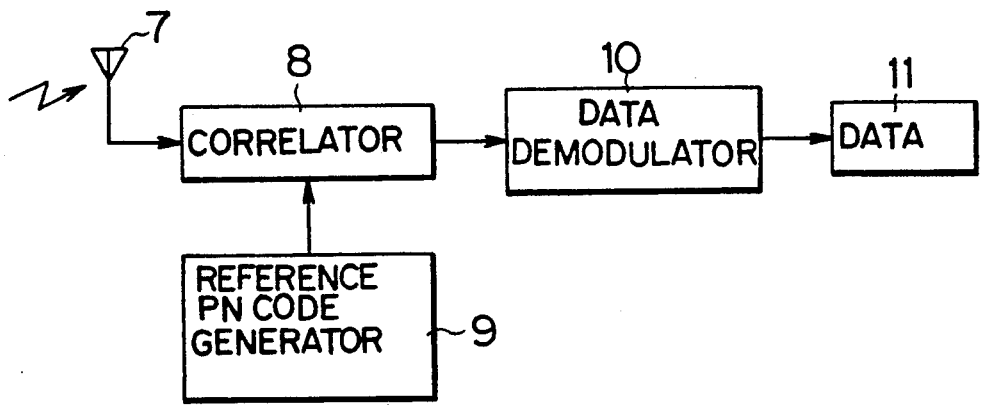
Figure 10:
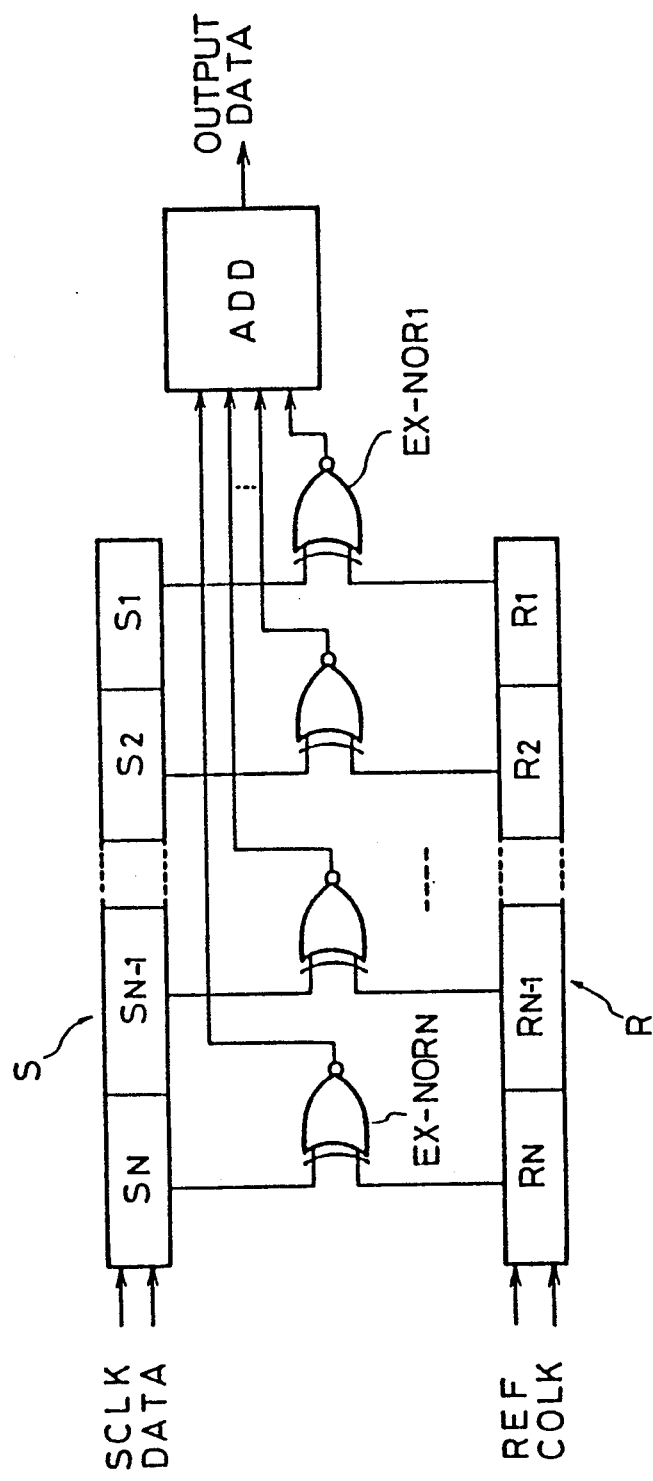
FIG. 10 is a block diagram showing an example of the construction of a digital correlator.

In the case where the borrow signal BORROW is inputted from the subtracter 26, when the trigger signal COMPOUT is outputted from the comparator 28, since it can be judges that the reverse phase clock $\overline{ICLK}$ or $\overline{QCLK}$ is sampling the neighborhood of the stabilization point of the PN code chip waveform, the control circuit 3 changes the state of the select signal S2 from "1" to "0" and sets the control signal so as to select the reverse phase clock $\overline{ICLK}$ or $\overline{QCLK}$. FIG. 8 shows a timing chart of the operation described above.

As explained above, according to the present invention, in a spread spectrum receiving device, it is possible to effect the A/D conversion at the neighborhood of the point, where the level of the PN code chip waveform is stable, without raising the sampling frequency or increasing the number of stages of the shift registers in the digital correlators, in the case where data demodulation is effected by using digital correlators.

Figure 14:
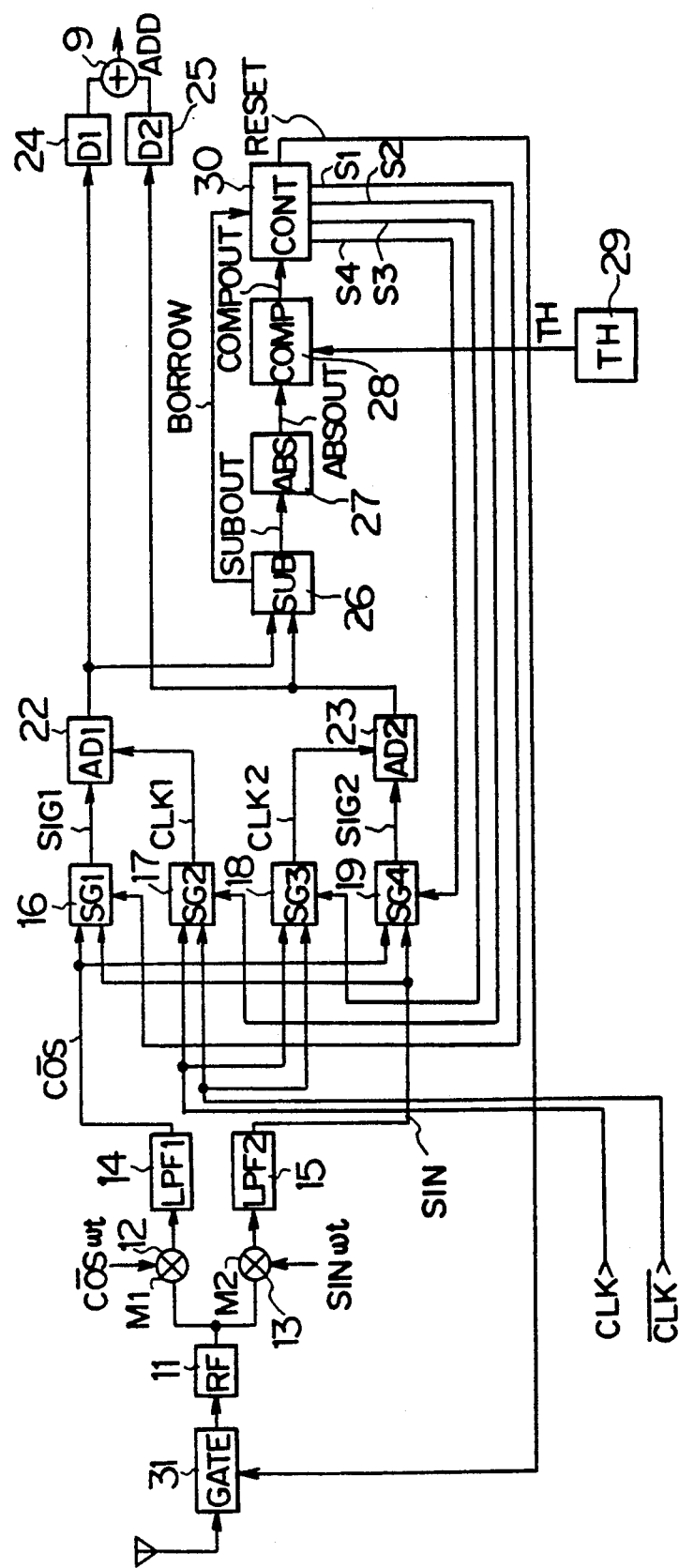
FIG. 14 is a block diagram showing the construction of a spread spectrum receiving device, which is another embodiment of the present invention.

FIG. 14 shows another embodiment of the present invention, in which same reference numerals or marks as those used in FIG. 1 indicate identical or similar circuits. The construction in the present embodiment comprises further a gate circuit GATE and an RF circuit RF.

Figure 15A:
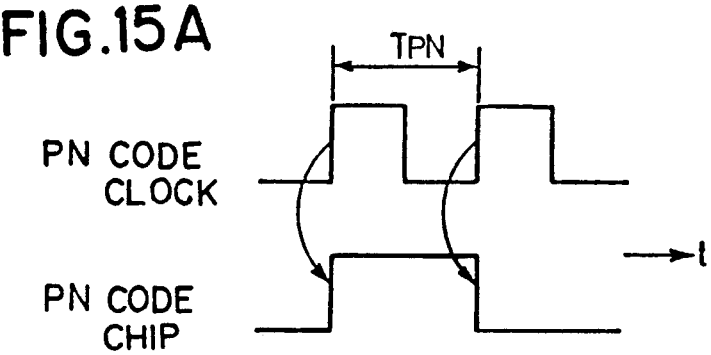
FIGS. 15(A) and 15(B) show waveforms for explaining the operation of the embodiment indicated in FIG. 14.
Figure 15B:
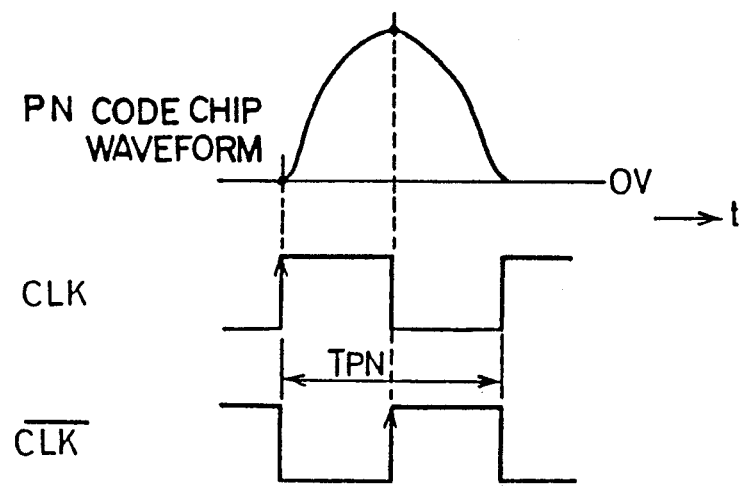

In FIG. 14, PN code chip waveform signals of the COS component and the SIN component are inputted to the steering gates 16 and 19, respectively. On the other hand, a positive phase clock CLK and a reverse phase clock $\overline{CLK}$ having a period equal to a PN code chip width, as indicated by (A) and (B) in FIG. 15, are inputted to the steering gates 17 and 18, respectively, as sampling clocks used for the A/D conversion. Outputs SIG1 and CLK1 of the steering gates SG1 and SG2, respectively, are inputted to the A/D converter 22 A/D-converting the PN code chip waveform signal of the COS component. Outputs SIG2 and CLK2 of the steering gates 16 and 17, respectively, are inputted to the A/D converter 23 A/D-converting the PN code chip waveform signal of the SIN component.

Select signals S1 and S4 are inputted from the control circuits 30 to the steering gates 16 and 19, respectively. In the initial state, it is supposed that the select signals S1 and S4 are "1" so that the PN code waveform signal of the COS component is selected. Further it is presumed that select signals S2 and S3 are inputted from the control circuit 30 to the steering gates 17 and 18, respectively, and that in the initial state the select signal S2 is "1" so that the positive phase clock ICLK is selected, while the select signal S3 is "0" so that the reverse phase clock $\overline{\text{ICLK}}$ is selected.

Figure 16:
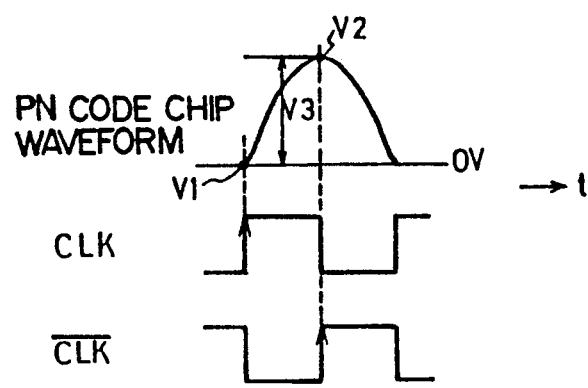
FIG. 16 shows waveforms for explaining the sampling operation for a PN code chip waveform signal in the embodiment indicated in FIG. 14.

Consequently, the A/D converter 22 samples the PN code chip waveform signal SIG1 of the COS component with the positive phase clock CLK1 to A/D-convert it. Similarly the A/D converter 23 samples the PN code chip waveform signal SIG2 of the COS component (SIG1=SIG2 at this point of time) with the reverse phase clock CLK2 to A/D-convert it. The sampling is effected in such a way that, supposing e.g. that it is effected by the rising edge of the positive phase edge CLK and the reverse phase clock $\overline{\text{CLK}}$, in the case where the rising edge of either one of them samples a stabilization point V2, the rising edge of the other samples 0 point V1, as indicated in FIG. 16. Outputs ADOUT1 and ADOUT2 of the A/D converters 22 and 23, respectively, are inputted to the subtracter SUB and a subtraction.

$$ADOUT1 - ADOUT2 \tag{3}$$

is thereby carried out. An output SUBOUT of the subtracter 26 obtained as the result is inputted to the absolute value forming device 27.

Further, when the result of calculation of (3) becomes negative, a borrow signal is produced and the borrow signal BORROW is inputted to the control circuit 30.

The output SUBOUT of the subtracter 26 is transformed into an absolute value output ABSOUT by the absolute value forming device 27, which is compared with a threshold value TH.

Now it is supposed that the threshold value TH is set at a value obtained by A/D conversion of the stabilization point V2 of the PN code chip waveform indicated in FIG. 16. The comparator 29 outputs a trigger signal COMPOUT to the control circuit 30, when the result of calculation of Equation (3) arrives at the threshold value. The control circuit 30 puts it in a disable state to output a reception timing reset signal RESET by the trigger signal COMPOUT. At the same time, when there is no input of the borrow signal BORROW from the subtracter SUB, the control circuit is set so as to change the state of the select signal S4 from "1" to "0" so that the PN code chip waveform signal of the SIN component is selected and the state of the select signal S3 from "0" to "1" so that the positive phase clock CLK is selected. This means that when the trigger signal COMPOUT is outputted from the comparator 28, the stabilization point of the PN code chip waveform is caught.

Figure 17A:
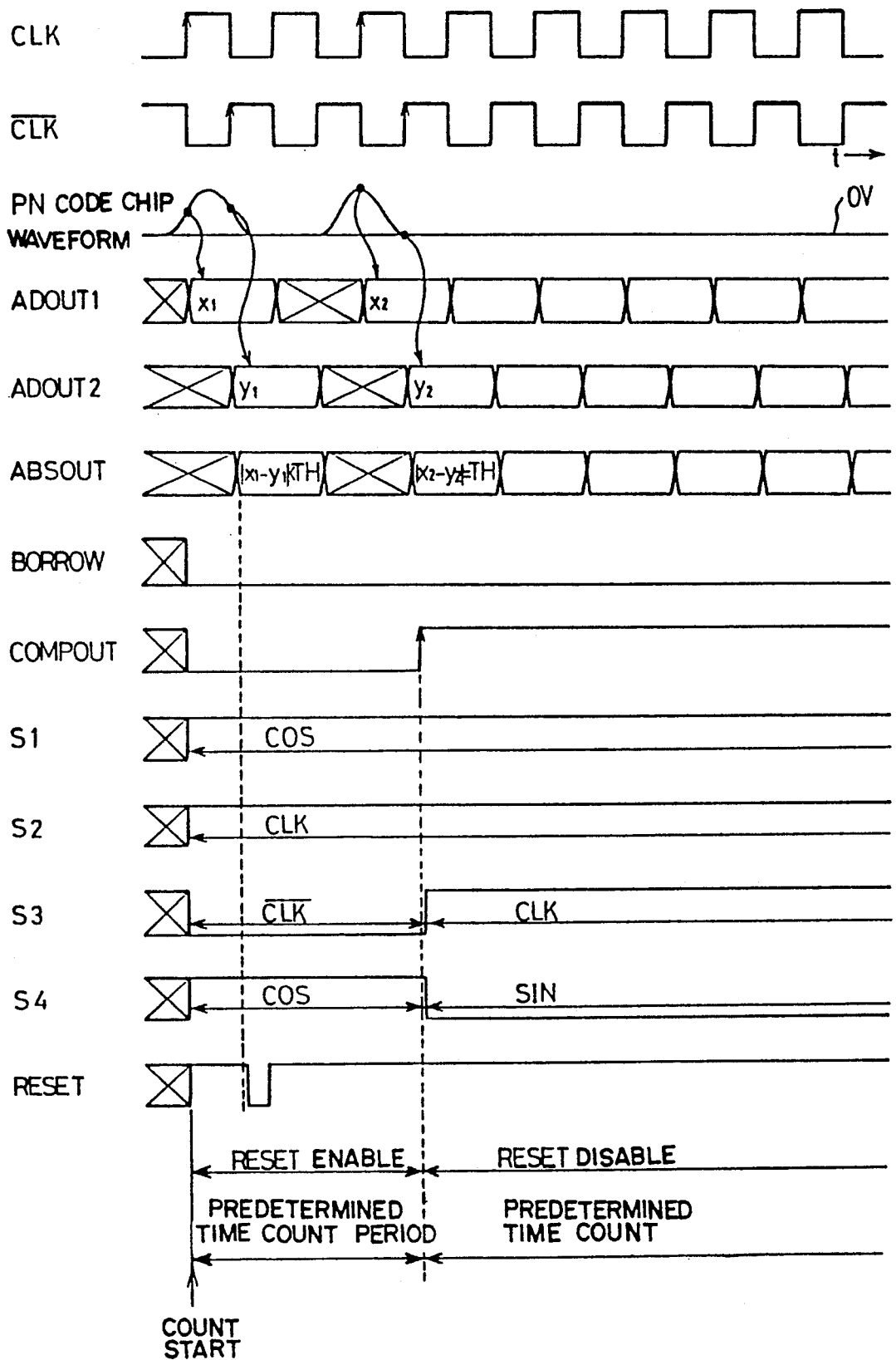
FIGS. 17(A), 17(B) and 17(C) are timing charts for explaining various operations of the embodiment indicated in FIG. 14.

On the contrary, during a period of time where no trigger signal COMPOUT is outputted from the comparator 28, the control circuit 30 changes the state of the reception timing reset signal RESET in a predetermined period from "1" to "0" and gates for a moment the signal received by the antenna by means of a gate circuit 31 disposed in the stage preceding the RF section RF. The time position of the PN code chip waveform and the sampling clock is varied by this instantaneous gating. FIG. 17(A) shows a timing chart for explaining the operation described above.

Figure 17B:
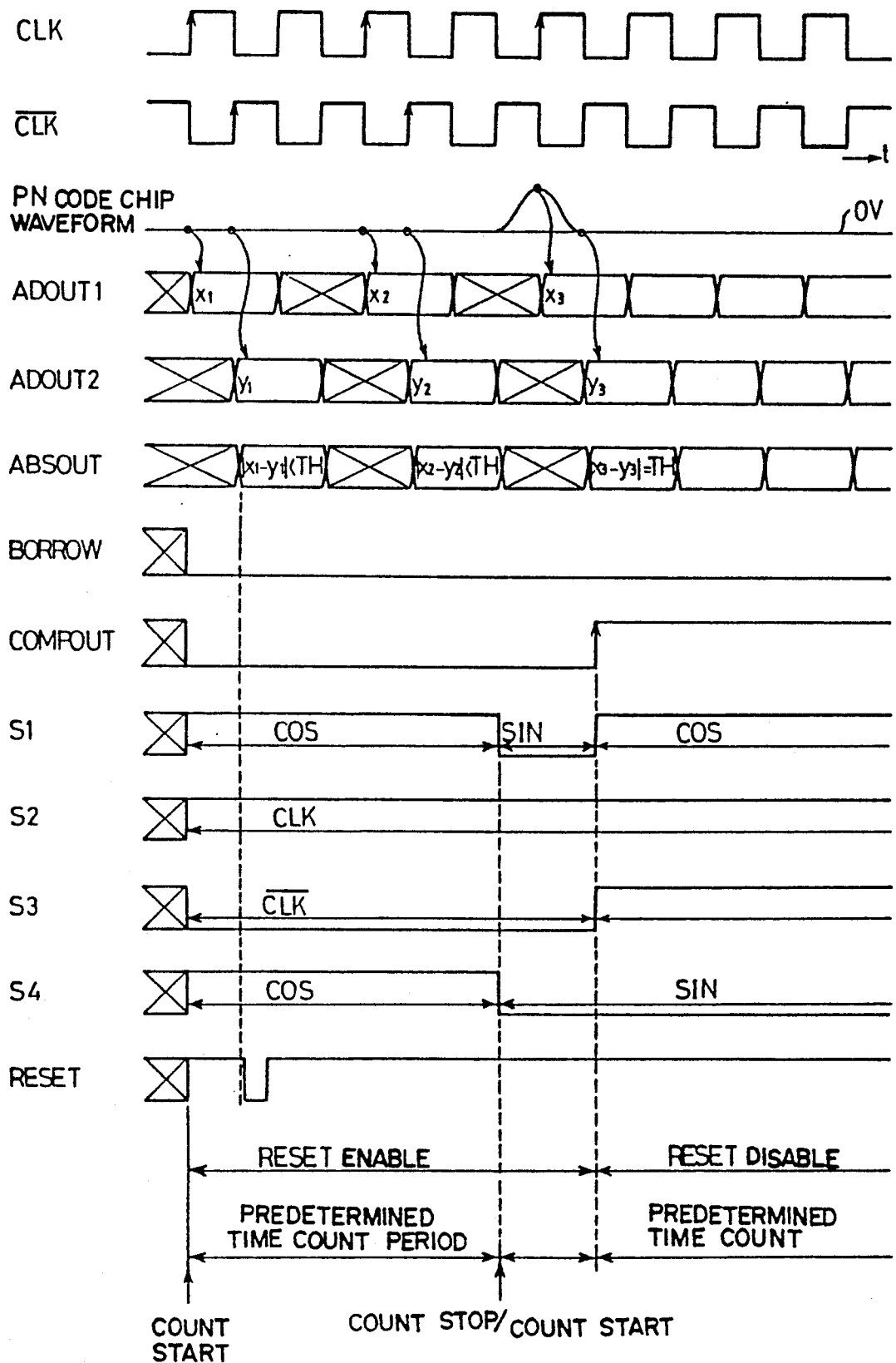

When no trigger signal COMPOUT is outputted from the comparator 28, even if a predetermined period has lapsed, since there is a possibility that the state is continued, in which the modulation carrier phase of the received SS-BPSK signal and the phase of COSωt and SINωt having a frequency equal to the modulation carrier frequency of the SS-BPSK signal on the receiver side are in accordance with each other for SINωt, in order to perform the operation described above for the PN code chip waveform of the SIN component indicated in FIG. 12, the control circuit changes the state of the select signal S1 and S4 from "1" to "0" and sets the control signal so as to select the PN code chip waveform of the SIN component. FIG. 17(B) shows a timing chart of the operation described above.

Figure 17C:
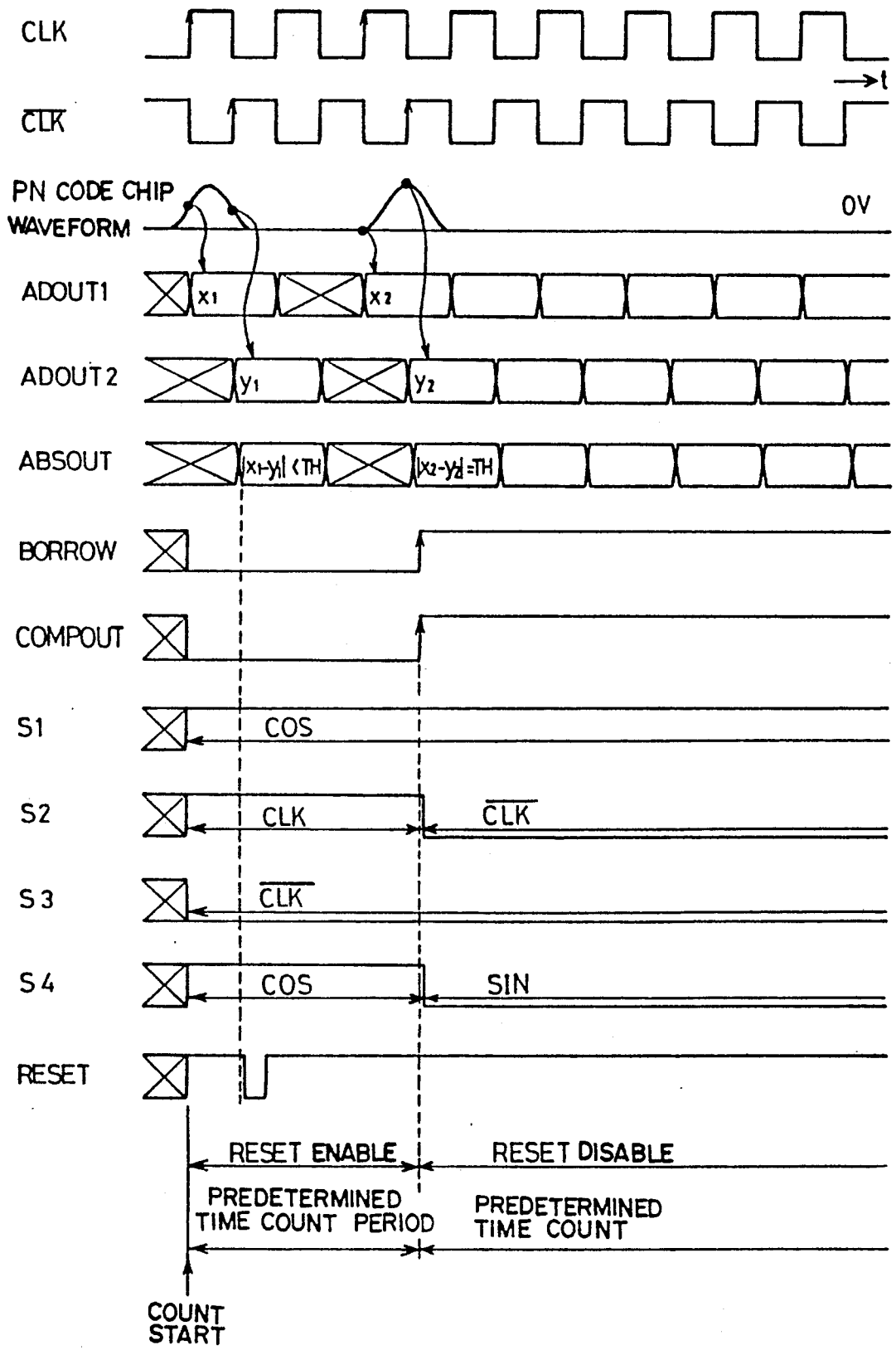

In the case where the borrow signal BORROW is outputted from the subtracter 26, when the trigger signal COMPOUT is outputted from the comparator 28, since it can be judged that the reverse phase clock $\overline{\text{CLK}}$ is sampling the stabilization point of the PN code chip waveform, the control circuit 30 changes the state of the select signal S2 from "1" to "0" and sets the control signal so as to select the reverse phase clock CLK. FIG. 17(C) shows a timing chart of the operation described above.

Figure 18:
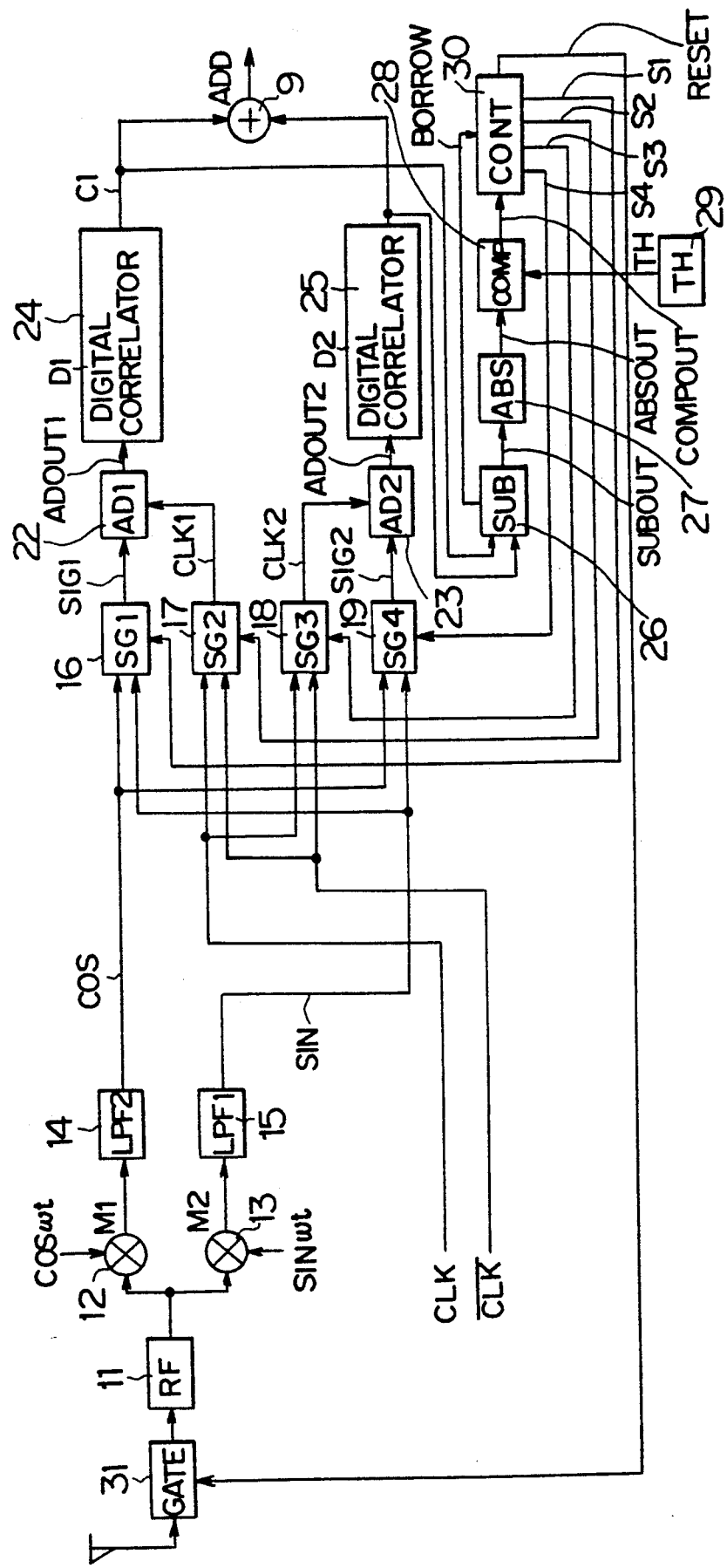
FIG. 18 is a block diagram showing the construction of a spread spectrum receiving device, which is still another embodiment of the present invention.
Figure 19A:
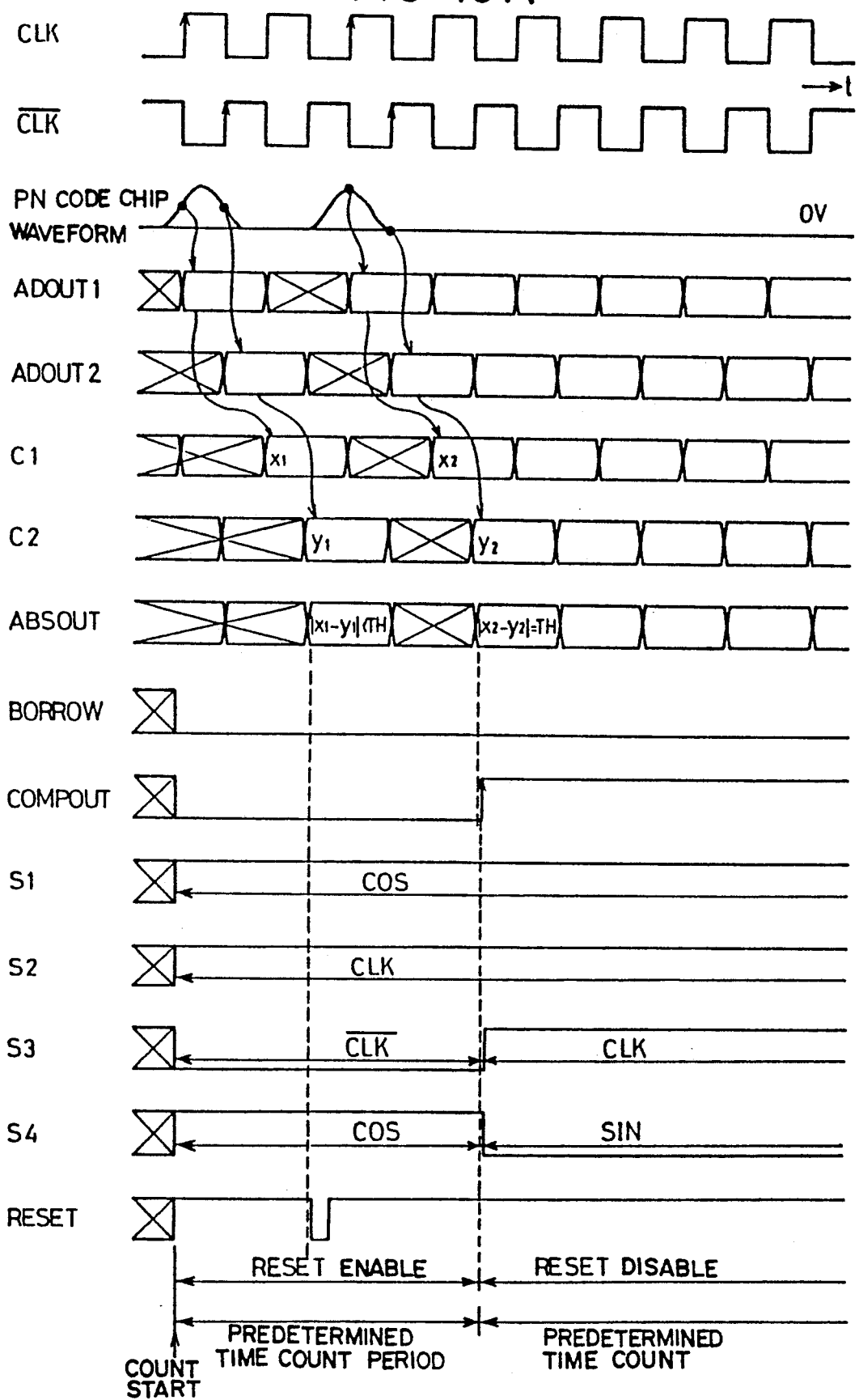
FIGS. 19,(A) 19(B) and 19(C) are timing charts for explaining various operations of the embodiment indicated in FIG. 18.
Figure 19C:
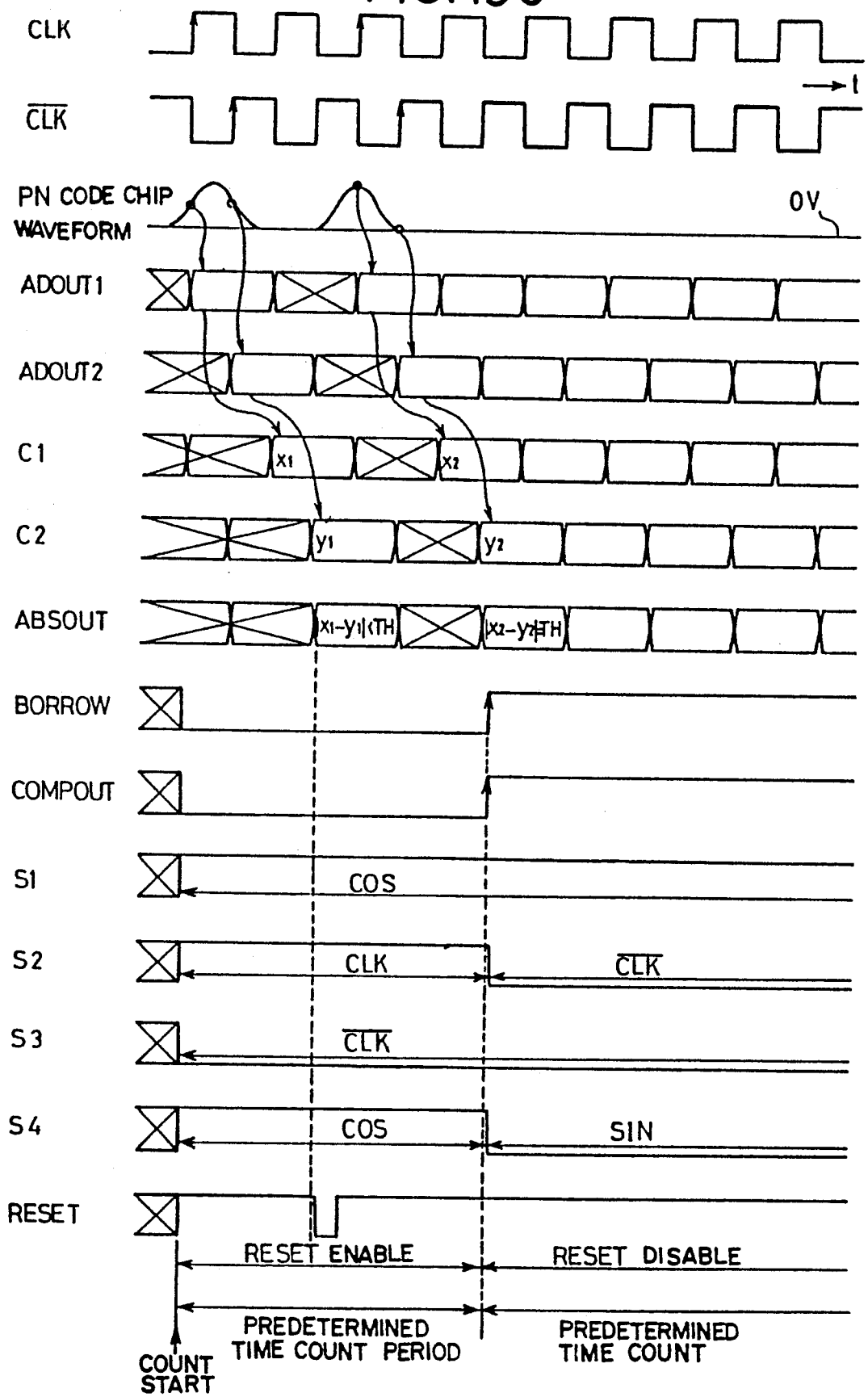

FIG. 18 shows still another embodiment of the present invention, which is constructed similarly to the embodiment described in FIG. 14, except that the correlation outputs C1 and C2 of the digital correlators 24 and 25, respectively, are inputted to the subtracter 26. Further the operation thereof is also similar and FIGS. 19(A), 19(B) and 19(C) show timing charts indicating the operation of the embodiment indicated in FIG. 18 corresponding to FIGS. 17(A), 17(B) and 17(C), respectively.

What is claimed is:
1. A spread spectrum receiving device comprising:
dividing and converting means, which divides a received signal into two parts, which are converted into a COS component signal and a SIN component signal by using a first carrier signal having a same frequency as a modulation frequency for said received signal and a second carrier signal having the same frequency and a phase different by $\pi/2$ from that of said first carrier signal, respectively;
a first and a second filter for extracting a COS PN code chip signal and a SIN PN code chip signal from said COS component signal and said SIN component signal, respectively;
first and second A/D-converting means for outputting A/D-converted signals corresponding to said COS PN code chip signal and said SIN PN code chip signal, respectively;
a first digital correlator for correlating an output of said first A/D-converting means with a first reference signal;
a second digital correlator for correlating an output of said second A/D-converting means with a second reference signal;
steering gate means disposed between said first and said second filter on one side and said first and said second A/D-converting means on the other side, said steering gate means giving said first and said second A/D-converting means said COS PN code chip signal and said SIN PN code chip signal, respectively, with a predetermined timing according to a control signal;
subtracting means for effecting a subtractraction between outputs of said first and said second digital correlator to output a signal corresponding to a result of the subtraction;

comparing means for judging whether said signal corresponding to the result of the subtraction is within a predetermined region or not to output a judgment signal; and control means for controlling said steering gate means by controlling said control signal, based on a state of an output of said comparing means and said signal corresponding to the result of the subtraction.

2. A spread spectrum receiving device comprising:

dividing and converting means, which divides a received signal into two parts, which are converted into a COS component signal and a SIN component signal by using a first carrier signal having a same frequency as a modulation frequency for said received signal and a second carrier signal having the same frequency and a phase different by $\pi/2$ from that of said first carrier signal, respectively;

a first and a second filter for extracting a COS PN code chip signal and a SIN PN code chip signal from said COS component signal and said SIN component signal, respectively;

first and second A/D-converting means for outputting A/D-converted signals corresponding to said COS PN code chip signal and said SIN PN code chip signal, respectively;

a first digital correlator for correlating an output of said first A/D-converting means with a first reference signal;

a second digital correlator for correlating an output of said second A/D-converting means with a second reference signal;

steering gate means disposed between said first and said second filter on one side and said first and said second A/D-converting means on the other side, said steering gate means giving said first and said second A/D-converting means said COS PN code chip signal and said SIN PN code chip signal, respectively, with a predetermined timing according to a control signal;

subtracting means for effecting a subtraction either between said outputs of said first and said second A/D-converting means or between outputs of said first and said second digital correlator to output a signal corresponding to a result of the subtraction;

comparing means for judging whether said signal corresponding to the result of the subtraction is within a predetermined region or not to output a judgment signal; and control means for controlling said steering gate means by controlling said control signal, based on a state of an output of said comparing means and said signal corresponding to the result of the subtraction.

3. A spread spectrum receiving device according to claim 1, wherein said steering gate means comprises:

a first and a second steering gate, to which said COS PN code chip signal and said SIN PN code chip signal are supplied and which outputs selectively those chip signals according to a first control signal;

a third steering gate, to which a first clock of normal phase having a period equal to a PN code chip width and a second clock, whose phase is shifted by $\pi/2$ with respect to that of said first clock, are inputted and which outputs them selectively according to a second control signal;

a fourth steering gate, to which a third clock and a fourth clock having reverse phases with respect to said first and said second clock, respectively, are inputted, and which outputs selectively those clocks according to said second control signal; and a fifth and a sixth steering gate, to which outputs of said third and said fourth steering gate are supplied, and which output selectively those outputs according to a third control signal;

wherein said first A/D-converting means A/D-converts an output of said first steering gate, using an output of said fifth steering gate as a sampling clock, and said second A/D-converting means A/D-converts an output of said second steering gate, using an output of said sixth steering gate as a sampling clock.

4. A spread spectrum receiving device according to claim 2, wherein said steering gate means comprises:

a second steering gate, to which said COS PN code chip signal and said SIN PN code chip signal are inputted and which outputs selectively those chip signals according to a control signal; and a third and a fourth steering gate, to which a first and a second clock of positive phase reverse phase, respectively, having a period equal to a PN code chip width and which outputs them selectively according to another control signal;

wherein said first A/D-converting means A/D-converts an output of said first steering gate, using an output of said third steering gate as a sampling clock, and said second A/D-converting means A/D-converts an output of said second steering gate, using an output of said fourth steering gate as a sampling clock.

5. A spread spectrum receiving device according to claim 4, wherein said received signal is gated, based on said control signal, to be given to said dividing and converting means.

6. A spread spectrum receiving device according to claim 2, wherein said steering gate means comprises:

a first and a second steering gate, to which said COS PN code chip signal and said SIN PN code chip signal are supplied and which outputs selectively those chip signals according to a second control signal; and a third and a fourth steering gate, to which a first and a second clock of positive phase and reverse phase, respectively, having a period equal to a PN code chip width and which outputs them selectively according to a third control signal;

wherein said first A/D-converting means A/D-converts an output of said first steering gate, using an output of said third steering gate as a sampling clock, and said second A/D-converting means A/D-converts an output of said second steering gate, using an output of said fourth steering gate as a sampling clock, and said subtracting means effects a subtraction between outputs of said first digital correlator and said second digital correlator.

7. A spread spectrum receiving device according to claim 6, wherein said received signal is gated, based on said control signal, to be given to said dividing and converting means.

8. A spread spectrum receiving device according to claim 1, wherein each of said steering gates includes at least three NAND gates and an inverter.

9. A spread spectrum receiving device according to claim 2, wherein each of said steering gates includes at least three NAND gates and an inverter.

10. A spread spectrum receiving device according to claim 1, wherein each of said digital correlators includes a first shift register, to which an output of each of the correlating means is given; a second shift register, to which a reference signal is given; a plurality of EX-NOR gates, to which outputs of different stages of the different shift registers are given; and an adding circuit, which adds outputs of said different EX-NOR gates.

11. A spread spectrum receiving device according to claim 2, wherein each of said digital correlators includes a first shift register, to which an output of each of the correlating means is given; a second shift register, to which a reference signal is given; a plurality of EX-NOR gates, to which outputs of different stages of the different shift registers are given; and an adding circuit, which adds outputs of said different EX-NOR gates.

* * * * *

UNITED STATES PATENT AND TRADEMARK OFFICE
CERTIFICATE OF CORRECTION

PATENT NO. : 5,285,471
DATED : February 8, 1994
INVENTOR(S) : Takao KURIHARA

It is certified that error appears in the above-identified patent and that said Letters Patent is hereby corrected as shown below:

```
Column 10, line 22; before "second" insert
                ---first and a---.
```

Signed and Sealed this

Twenty-first Day of June, 1994

Attest:

BRUCE LEHMAN

Attesting Officer     Commissioner of Patents and Trademarks